(12) United States Patent
Schoemann et al.

(10) Patent No.: US 7,060,215 B2
(45) Date of Patent: Jun. 13, 2006

(54) METHOD OF FORMING A VEHICLE TRIM PANEL

(75) Inventors: Michael P. Schoemann, Waterford, MI (US); Robert J. Adams, Ypsilanti, MI (US); Glenn Cowelchuk, Chesterfield Township, MI (US); William J. Noble, Macolm, MI (US)

(73) Assignee: Lear Corporation, Southfield, MI (US)

( * ) Notice: Subject to any disclaimer, the term of this patent is extended or adjusted under 35 U.S.C. 154(b) by 287 days.

(21) Appl. No.: 10/392,066

(22) Filed: Mar. 19, 2003

(65) Prior Publication Data
US 2004/0017023 A1    Jan. 29, 2004

Related U.S. Application Data

(63) Continuation-in-part of application No. 10/207,333, filed on Jul. 29, 2002.

(51) Int. Cl.
  *B29C 45/16*    (2006.01)
(52) U.S. Cl. .................. 264/245; 264/255; 264/267; 264/275; 425/127; 425/129.1
(58) Field of Classification Search ............ 264/245, 264/255, 275, 267, 271.1; 425/127, 129.1
See application file for complete search history.

(56) References Cited

U.S. PATENT DOCUMENTS

| | | | |
|---|---|---|---|
| 5,045,268 A | 9/1991 | Sorensen | |
| 5,098,622 A | 3/1992 | Lilienthal et al. | |
| 5,328,651 A | 7/1994 | Gallagher et al. | |
| 5,472,655 A * | 12/1995 | Morita | 264/245 |
| 5,618,485 A * | 4/1997 | Gajewski | 264/255 |
| 5,626,382 A | 5/1997 | Johnson et al. | |
| 5,633,289 A | 5/1997 | Nakamura et al. | |
| 5,788,906 A * | 8/1998 | Morita | 264/245 |
| 5,947,511 A * | 9/1999 | Usui et al. | 280/728.3 |
| 6,037,038 A | 3/2000 | Kuhr | |
| 6,054,087 A * | 4/2000 | Noirot et al. | 264/251 |
| 6,183,038 B1 | 2/2001 | Hansen et al. | |
| 6,210,613 B1 | 4/2001 | Stein et al. | |
| 6,224,364 B1 * | 5/2001 | Harvey | 425/130 |
| 6,348,169 B1 | 2/2002 | Stipes et al. | |
| 6,391,232 B1 | 5/2002 | Fritsch | |
| 6,413,460 B1 * | 7/2002 | Wisniewski et al. | 264/254 |
| 2001/0028131 A1 | 10/2001 | Brodi, Jr. et al. | |
| 2002/0066972 A1 | 6/2002 | Fritsch | |
| 2002/0162623 A1 | 11/2002 | Saint-Dizier | |

* cited by examiner

*Primary Examiner*—Edmund H. Lee
(74) *Attorney, Agent, or Firm*—MacMillan, Sobanski & Todd, LLC

(57) ABSTRACT

A method of manufacturing an overmolded trim component includes providing a first mold portion and a movable mold element. The movable mold element includes first and second mold surfaces positioned at a first angle with respect to one another. The movable mold element is then positioned into the first position to define a first cavity. A first material is then introduced into the first cavity, thereby forming a substrate. The substrate includes a first substrate surface is at a second angle with respect to a second substrate surface. The movable mold element is then positioned into the second position to define a second cavity. A second material is then introduced into the second cavity, thereby forming an overmolded trim component. The movable mold element is oriented at a third angle with respect to the first substrate surface and at a fourth angle with respect to the second substrate surface.

20 Claims, 11 Drawing Sheets

METHOD OF FORMING A VEHICLE TRIM PANEL

CROSS REFERENCE TO RELATED APPLICATION

This application is a continuation-in-part of U.S. application Ser. No. 10/207,333, filed Jul. 29, 2002.

TECHNICAL FIELD

This invention relates to interior vehicle trim panels. More particularly, the invention relates to a method of manufacturing interior vehicle trim panels.

BACKGROUND OF THE INVENTION

It is known to provide an interior trim panel for a vehicle which is aesthetically and/or tactilely pleasing to the vehicle occupants. However, known methods of manufacturing interior vehicle trim panels may add significant cost to each vehicle produced. It would therefore be desirable to provide an improved method of manufacturing an interior trim panel for a vehicle.

SUMMARY OF THE INVENTION

This invention relates to an improved method of manufacturing an overmolded trim component for a vehicle. Initially, a mold assembly is provided. The mold assembly includes a first mold portion and a movable mold element which is movable between first and second positions. The movable mold element includes a first mold surface and a second mold surface positioned at a first angle with respect to the first mold surface. The movable mold element is then positioned into the first position to define a first cavity. The first cavity is defined by the first mold portion and the first and second mold surfaces of the movable mold element. A first material is then introduced into the first cavity, thereby forming a substrate. The substrate includes a first substrate surface and a second substrate surface, wherein the first substrate surface is at a second angle with respect to the second substrate surface. The movable mold element is then positioned into the second position to define a second cavity. The second cavity is defined by a portion of the first and second substrate surfaces and the first and second mold surfaces of the movable mold element. A second material is then introduced into the second cavity, thereby forming an overmolded trim component. The movable mold element is preferably oriented at a third angle with respect to the first substrate surface and at a fourth angle with respect to the second substrate surface.

Various objects and advantages of this invention will become apparent to those skilled in the art from the following detailed description of the preferred embodiment, when read in light of the accompanying drawings.

DETAILED DESCRIPTION OF THE INVENTION

Figure 1:
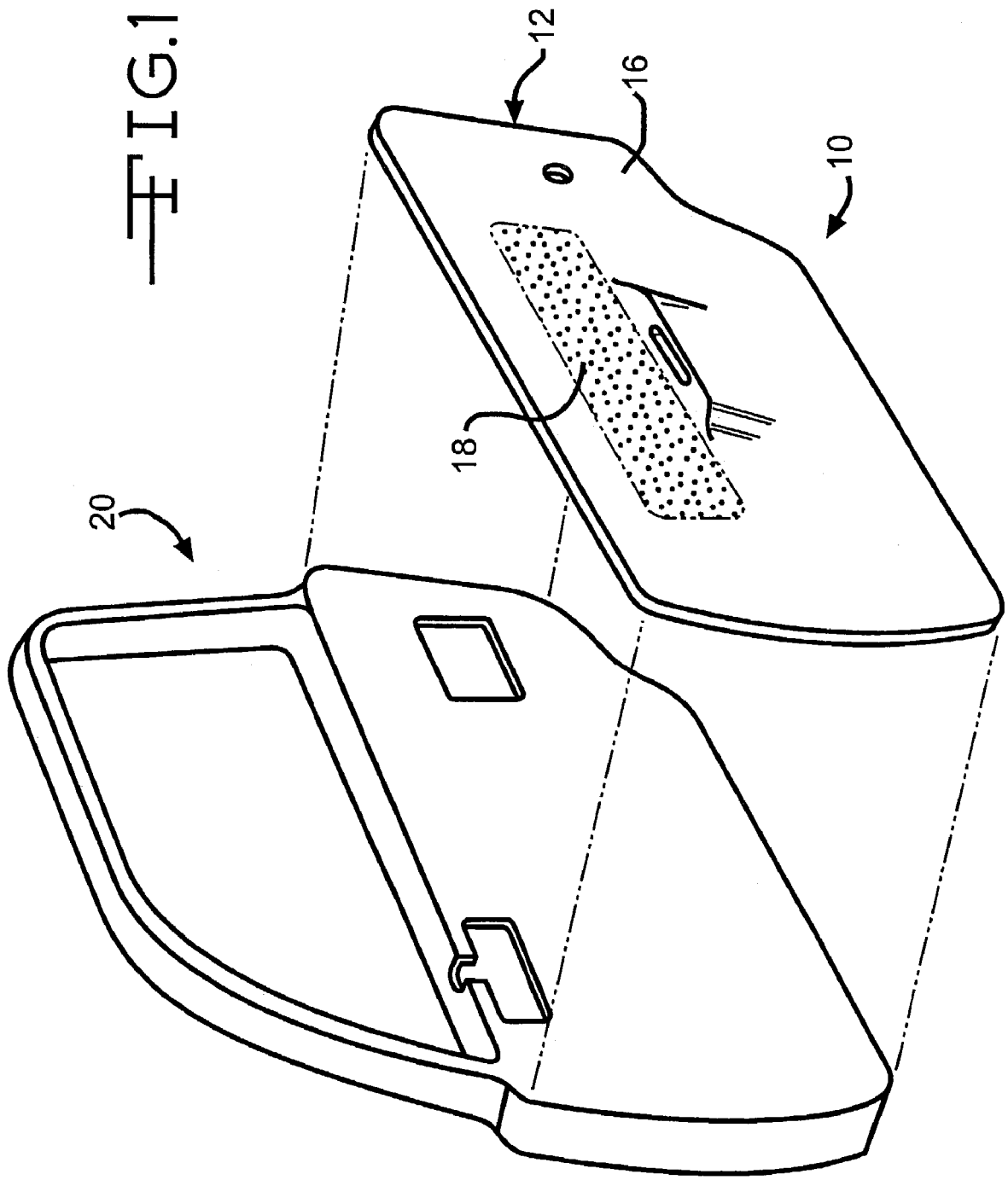
FIG. 1 is an exploded perspective view of a vehicle trim panel manufactured according to the method of this invention.

Referring now to the drawings, there is illustrated in FIG. 1 a vehicle trim panel assembly, generally shown at 10. The trim panel assembly 10 comprises a trim component or panel 12 of an electrically non-conductive material having an exterior surface 16. Preferably, the trim panel includes an accent region 18. The trim panel 16 of the preferred embodiment is an automotive door trim panel 12 which mounts to a vehicle door assembly, generally shown at 20. It will be appreciated however, that the trim panel 12 of the subject invention may be any type of trim panel associated with a vehicle. For example, other types of trim panels include trunk panels, quarter panels, rear package trays, headliners, instrument panels, garnish moldings, and console panels, among others.

The door trim panel 12 is preferably formed of a molded plastic material such as polypropylene. As appreciated by those skilled in the art, the trim panel 12 may be fabricated of other materials, such as wood fibers, polyurethane, solid molded vinyl, expanded polyurethane foam, any combination thereof, or any other suitable rigid, electrically non-conductive material. The exterior surface 16 of the trim panel 12 may include a decorative surface portion, such as accent region 18, illustrated by a phantom line. The accent region 18 is also preferably formed of a molded plastic material such as thermoplastic urethane (TPU). As will be explained in detail below, the exterior surface 16 and the accent region 18 may be formed of the same or different materials. Further, as will be explained in detail below, the exterior surface 16 and the accent region 18 may have the same or different surface textures.

Although not illustrated in FIG. 1, it will be appreciated that portions of the trim panel 12 may be covered with a decorative trim material such as cloth, vinyl, leather, and/or carpeting. The trim panel 12 may be attached to the vehicle door assembly 20 by suitable fasteners (not shown) as is well known in the art.

Figure 2:
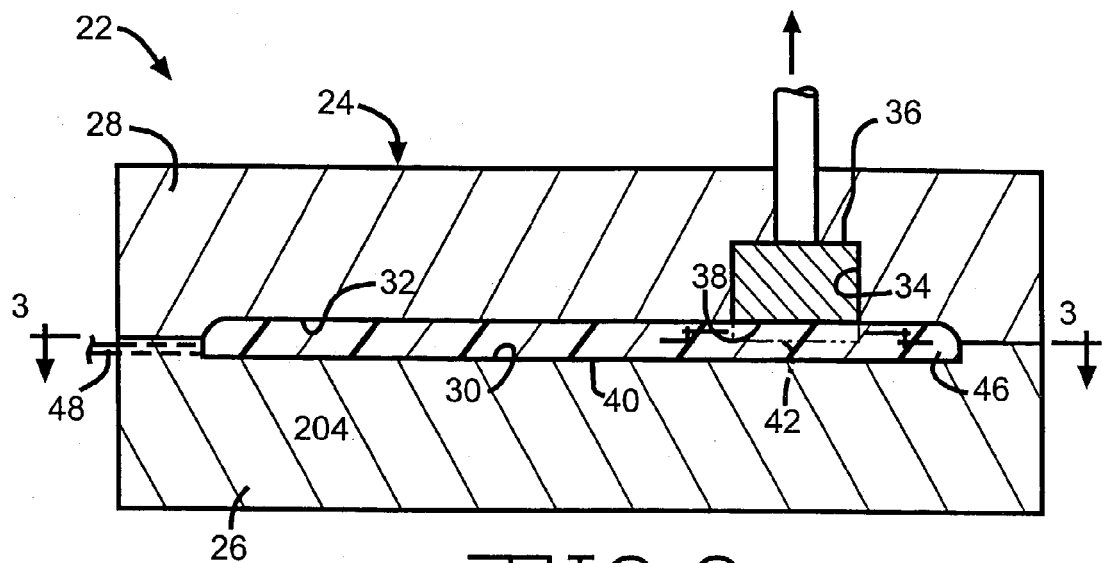
FIG. 2 is a cross sectional elevational view showing the vehicle trim panel illustrated in FIG. 1 in a mold used in accordance with a second step of the method of this invention.

Referring now to FIG. 2, there is illustrated a mold assembly, indicated generally at 24, which is adapted to be used in accordance with the method of this invention. Typically, the mold assembly 24 includes a first mold half 26 and a second mold half 28. The first mold half 26 includes a first mold surface 30, and the second mold half 28 includes a second mold surface 32. Although illustrated schematically in FIGS. 2 through 7, it will be appreciated that the mold surfaces 30 and 32 may be of any desired shape and contour. For example, first mold surface 30 might be a mold core, and second mold surface 32 might be a corresponding mold cavity. The first mold half 26 and second mold half 28 are preferably mounted to platens (not shown) of a press (not shown), such as a vertical molding press with sufficient tonnage to accomplish the method herein described. When in a closed position, as shown in FIG. 2, the first mold half 26 and the second mold half 28 form a first cavity 40.

Figure 4:
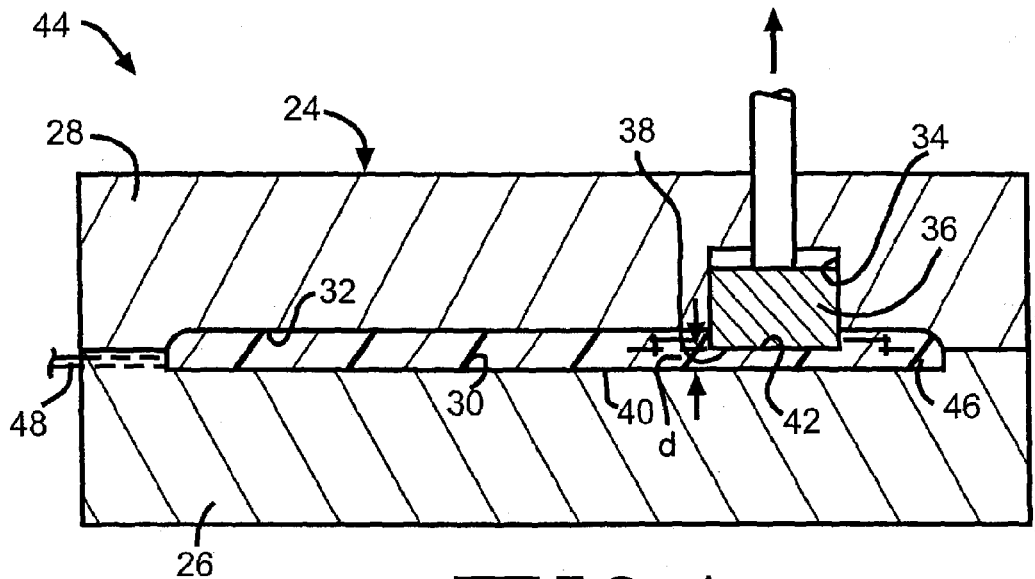
FIG. 4 is a cross sectional elevational view of the mold illustrated in FIG. 2 showing a portion of a third step of the method of this invention.

The second mold half 28 includes a core cavity 34 for slidably receiving a movable mold element or core 36. The movable core 36 can include a third mold surface 38, and is movable between a first position, as shown in FIG. 2, and a second position, as shown in FIG. 4. When in the second position, the core 36 defines a second cavity 42, shown in FIG. 2 in phantom line.

It will be appreciated, that in accordance with each embodiment of the invention, as will be described below, a first step of the method of the invention includes providing a suitable mold assembly 24, 24', and 102.

Figure 3:
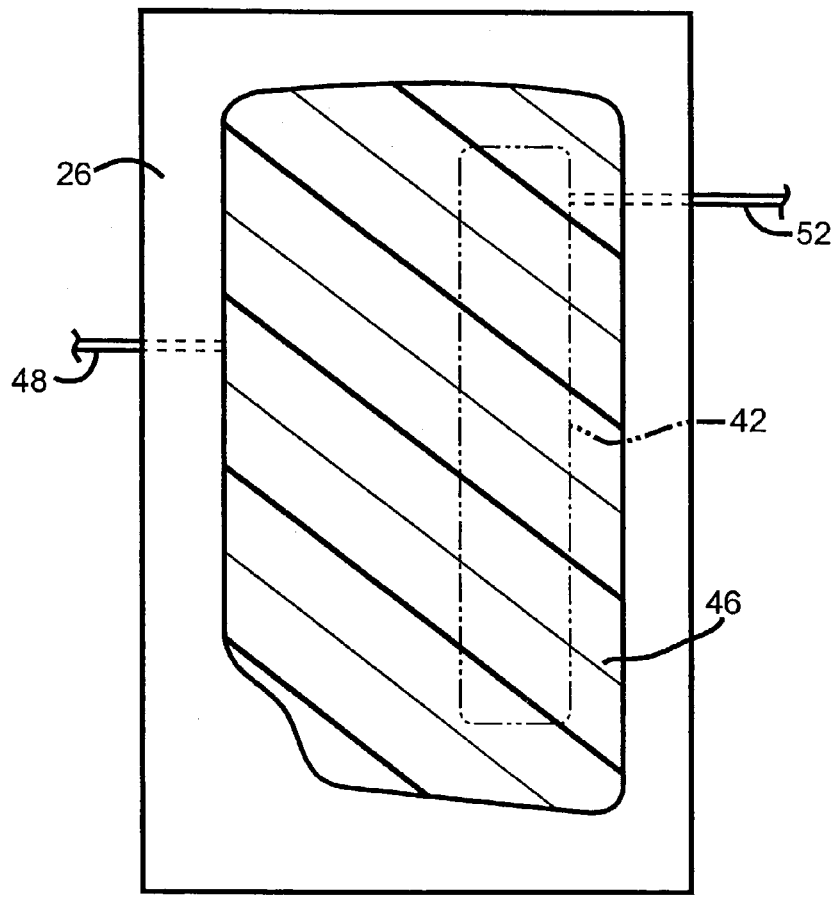
FIG. 3 is a reduced cross-sectional view of the vehicle trim panel and mold illustrated in FIG. 2, taken along line 3—3 of FIG. 2.

A second step of the method of this invention is illustrated generally at 22 in FIG. 2. In the second step 22, the core 36 is moved upwardly, as viewed in FIG. 2, within the core cavity 34, and into a first position. The first position is defined as a position wherein the third mold surface 38 of the core 36 defines a portion of the second mold surface 32, thereby substantially exposing the second cavity 42. A first material 46 is then introduced into the first cavity 40 and the second cavity 42 through a first passage 48. Preferably the first material 46 is molten plastic, such as polypropylene. As shown in FIG. 3, both the first cavity 40 and the second cavity 42 are filled with the first material 46. The first material 46 then conforms to the shape of the first cavity 40 and the second cavity 42, shown in phantom line in FIG. 6, thereby forming the trim panel 12. The trim panel 12 is then removed from the mold assembly 24 by any suitable method (not shown).

Figure 5:
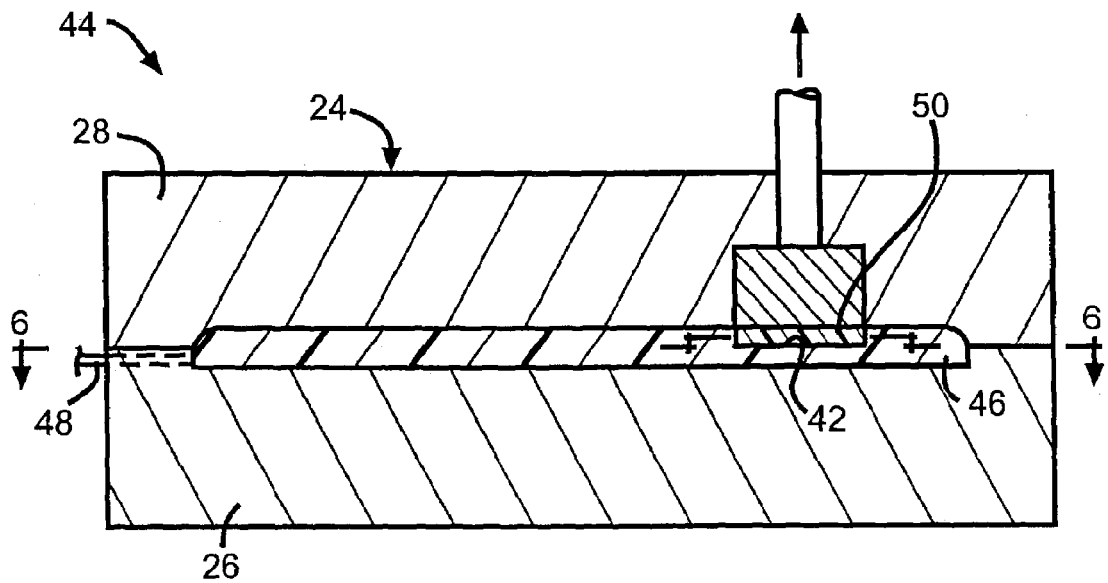
FIG. 5 is a cross sectional elevational view of the mold illustrated in FIG. 4 showing an additional portion of the third step of the method of this invention.

A third step of the method of this invention is illustrated generally at 44 in FIGS. 4 and 5. In the third step 44, the core 36 is moved downwardly within the core cavity 34, as viewed in FIG. 4, and into a second position. The second position is defined as a position wherein the third mold surface 38 of the core 36 is positioned in a spaced relationship at a distance d from the first surface 30. The core 36 thereby substantially obstructs the second cavity 42. Preferably, the distance d is any desired distance greater than or equal to zero.

Figure 6:
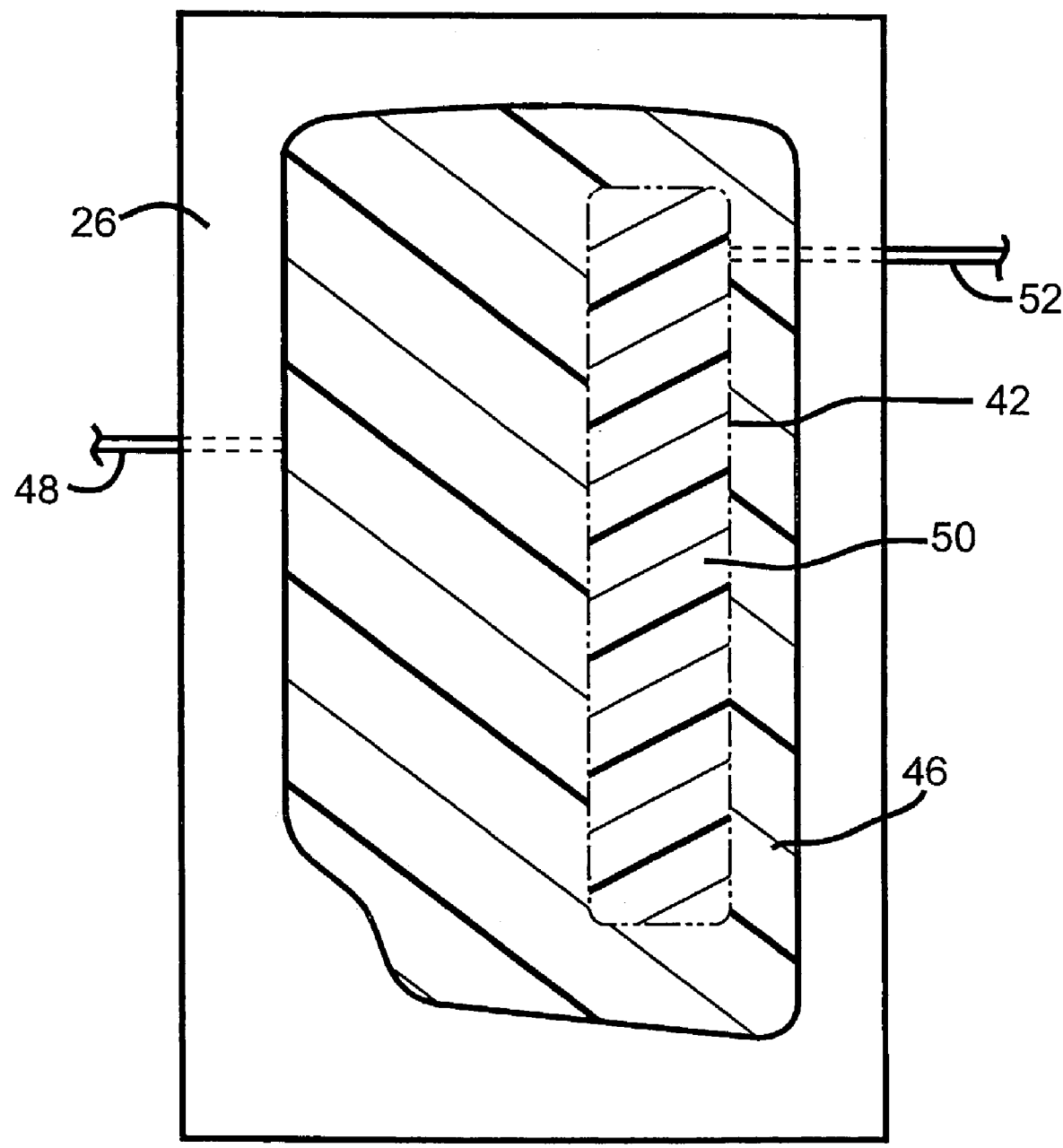
FIG. 6 is a reduced cross-sectional view of the vehicle trim panel and mold illustrated in FIG. 5, taken along line 6—6 of FIG. 5.

A material is then introduced into the first cavity 40 through the first passage 48. The material may be any suitable material, such as the first material 46. Preferably the material is the first material 46, and is molten plastic, such as polypropylene, although the first material 46 is not required. The core 36 is then is moved upwardly within the core cavity 34, as viewed in FIG. 5, and into the first position, thereby exposing the second cavity 42. A second material 50 is then introduced into the second cavity 42 through a second passage 52, as shown in FIG. 6. The second material 50 may be molten plastic, such as polypropylene. Preferably, however, the second material 50 has characteristics different from the first material 46, thereby creating an accent region 18 having an aesthetically and tactilely pleasing surface.

For example, the first and second materials 46 and 50 may be of the same material but of different colors, thereby producing a two-color, one-material trim panel 12. Preferably, however, the first and second materials 46 and 50 are of different material. For example, the first material 46 is preferably a harder material, such as polypropylene, and the second material 50 is a softer material, such as TPU or thermoplastic elastomer (TPE). As shown in FIGS. 5 and 6, the first material 46 then conforms to the shape of the first cavity 40 and the second material conforms to the shape of the second cavity 42, thereby forming the trim panel 12. The trim panel 12 is then removed from the mold assembly 24 by any suitable method.

An important aspect of the method of the invention is that the second step 22 may be performed prior to the third step 44, or the third step 44 may be performed prior to the second step 22. It has been discovered that such a method reduces costs by providing for the production of multiple trim panels using one mold assembly 24, and substantially reduces trim panel assembly time.

Figure 7:
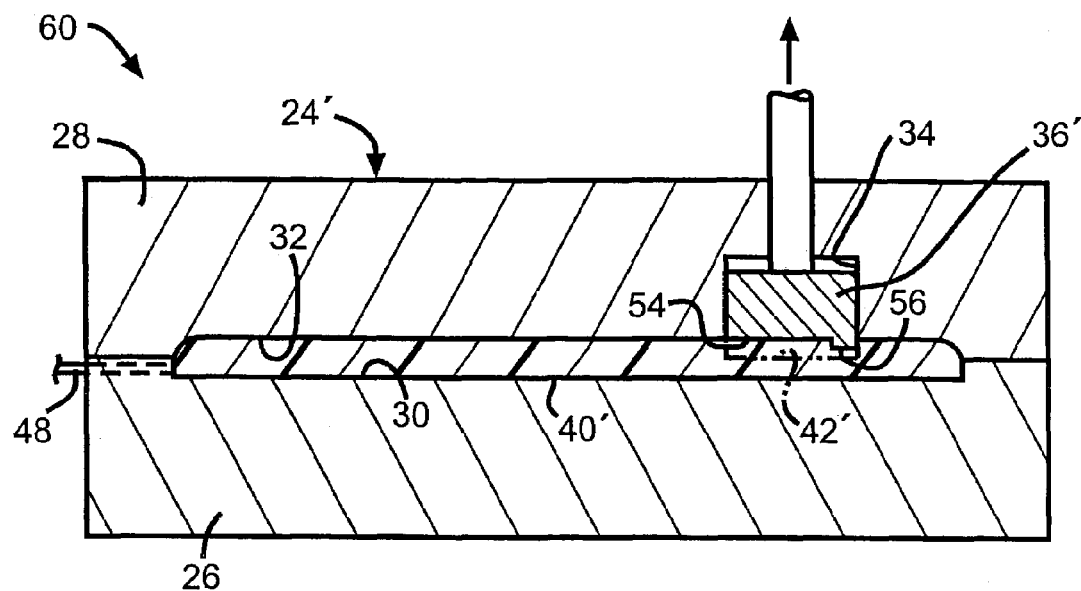
FIG. 7 is a cross sectional elevational view showing the vehicle trim panel illustrated in FIG. 1 in a mold used in accordance with a third step of an alternate embodiment of the method of this invention.
Figure 8:
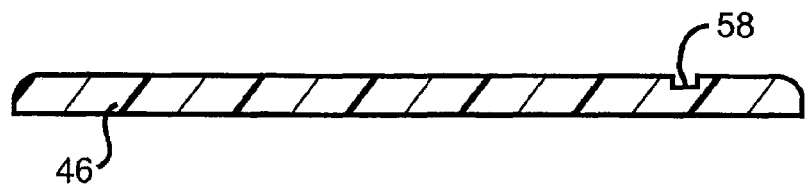
FIG. 8 is a cross sectional elevational view of a vehicle trim panel showing the trim panel after the first step of the alternate embodiment of the method of this invention.
Figure 9:
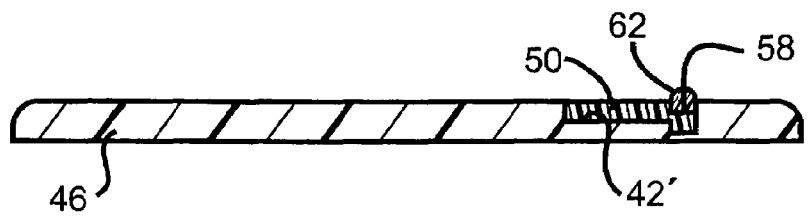
FIG. 9 is a cross sectional elevational view of the vehicle trim panel illustrated in FIG. 7 showing the trim panel after the third step of the alternate embodiment of the method of this invention.

FIGS. 7 through 9 illustrate a first alternate embodiment of the mold assembly 24' according to a first alternate embodiment of the method. The mold assembly 24' is substantially identical to the mold assembly 24 shown in FIG. 2, except that the second mold half 28 of the mold assembly 24' includes a movable core 36'. The core 36' includes a fourth mold surface 54, and a fifth mold surface 56. The core 36' is movable between a first position, as shown in FIG. 7, and a second position, (not shown). When in the second position, the core 36' defines a second cavity 42', and a third cavity or channel 58, as shown in FIG. 9.

A second step of a first alternate embodiment of the method of this invention is illustrated generally at 60 in FIG. 7, and is substantially identical to the second step 22. In the second step 60 of the first alternate embodiment, the core 36' is moved upwardly within the core cavity 34, as viewed in FIG. 7, and into the first position. The first position is defined as a position wherein the fourth mold surface 54 of the core 36' defines a portion of the second mold surface 32, and the fifth mold surface 56 obstructs a portion of the second cavity 42', shown in phantom line in FIG. 7. The fifth mold surface 56 thereby defines the channel 58, as shown in FIGS. 8 and 9.

A first material 46 is then introduced into the first cavity 40' and the second cavity 42'. As described in regards to the second step 22, both the first cavity 40' and the second cavity 42' are filled with the first material 46. The first material 46 then conforms to the shape of the first cavity 40' and the second cavity 42', thereby forming the trim panel 12. The trim panel 12 is then removed from the mold assembly 24 by any suitable method. As shown in FIG. 8, the trim panel 12 formed according to the first alternate embodiment of the method includes the channel 58 which has a shape corresponding to the shape of the fifth mold surface 56.

A third step of the first alternate embodiment of the method is not illustrated, but is substantially identical to the third step 44. In the third step, the core 36' is moved downwardly within the core cavity 34, whereby the core 36' obstructs the second cavity 42', and into a second position (not shown). It will be understood, however, that in the second position, the mold surfaces 54 and 56 of the core 36' will be substantially defined by the phantom line 42'.

A material is then introduced into the first cavity 40' through the first passage 48. The material may be any suitable material, such as the first material 46, or the second material 50. Preferably the material is the first material 46, and is molten plastic, such as polypropylene. The core 36' is then is moved upwardly within the core cavity 34, as viewed in FIG. 7, and into the first position, thereby exposing the second cavity 42'. The second material 50 is then introduced into the second cavity 42', as shown in phantom line in FIG. 7. Preferably, the second material 50 is different from the first material 46, thereby creating an accent region 18 having an aesthetically and tactilely pleasing surface. The trim panel 12 is then removed from the mold assembly 24' by any suitable method, thereby exposing the channel 58. A third material 62 is then mounted within the channel 58 by any suitable means, such as adhesive, hook and loop fasteners, or threaded fasteners. Preferably, the third material 62 is a decorative strip, such as plastic, fabric, or wood.

It will be appreciated that the second step 60 of the first alternate embodiment may be performed prior to the third step, or the third step may be performed prior to the second step 60.

Figure 10:
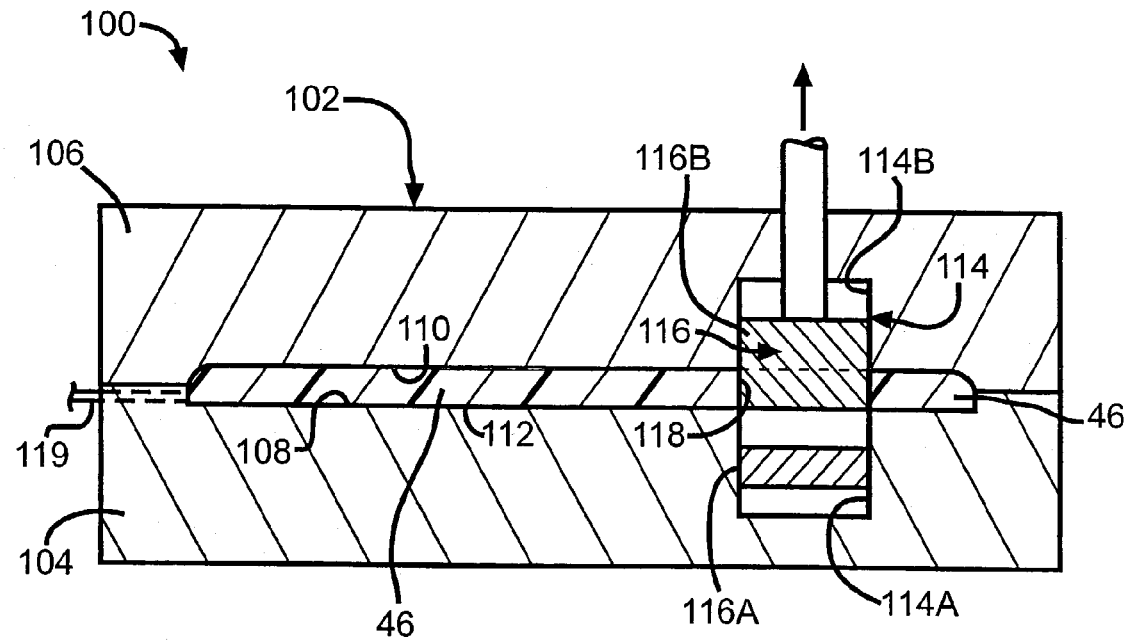
FIG. 10 is a cross sectional elevational view showing the vehicle trim panel illustrated in FIG. 1 in mold used in accordance with a portion of a third step of an additional alternate embodiment of the method of this invention.
Figure 11:
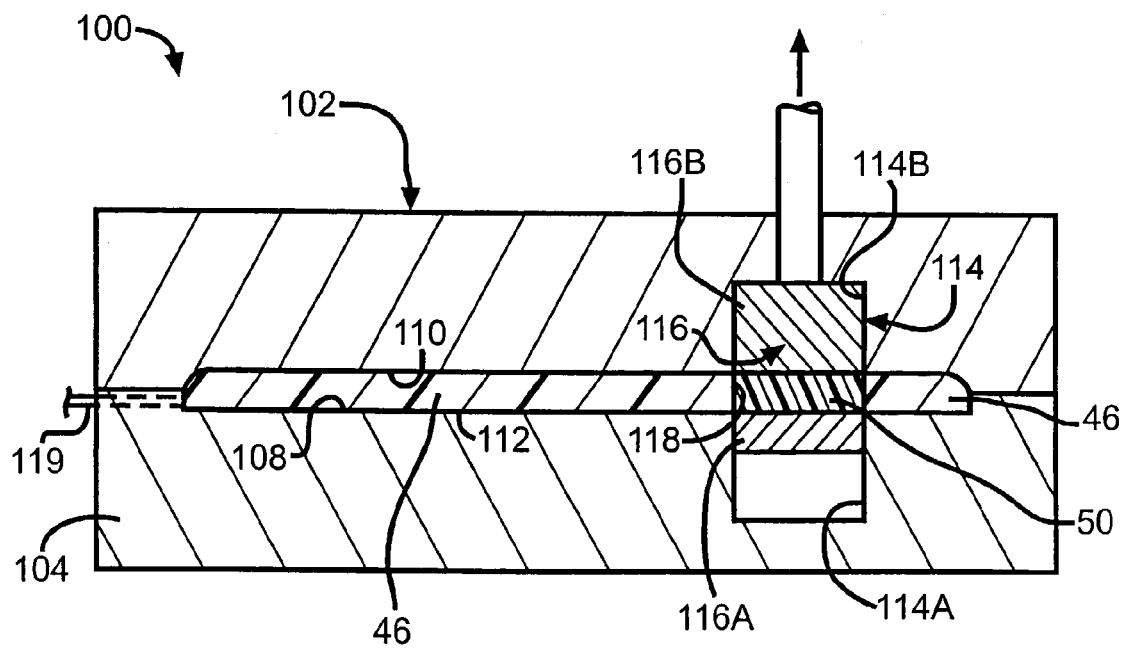
FIG. 11 is a cross sectional elevational view showing the vehicle trim panel showing a additional portion of the third step of the alternate embodiment of the method illustrated in FIG. 10.

FIGS. 10 and 11 illustrate a second alternate embodiment of the mold assembly 102 according to a second alternate embodiment of the method. Typically, the mold assembly 102 includes a first mold half 104 and a second mold half 106. The first mold half 104 includes a first surface 108, and the second mold half 106 includes a second mold surface 110. Although illustrated schematically in FIGS. 10 and 11, it will be appreciated that the mold surfaces 108 and 110 may be of any desired shape and contour. For example, first mold surface 108 might be a mold core, and second mold surface 110 might be a corresponding mold cavity. When in a closed position, as shown in FIG. 11, the first mold half 104 and the second mold half 106 form a first cavity 112.

The first mold half 104 includes a first portion 114A of a core cavity 114. The second mold half 106 includes a second portion 114B of the core cavity 114 for slidably receiving a movable mold element or core 116. The movable core 116 includes a first half 116A, a second half 116B and a core cavity 116C. The core 116 is movable between a first position, as shown in FIG. 11, and a second position, as shown in FIG. 10. When in the second position, the core 116 defines a second cavity 118, as shown in FIG. 10. When in the first position, the core cavity 116C defines the second cavity 118, as shown in FIG. 11.

A second step of a second alternate embodiment of the method is not illustrated, but substantially identical to the second step 22. In the second step of the second alternate embodiment, the core 116 is moved upwardly within the core cavity 114, as viewed in FIG. 11, and into the first position. The first position is defined as a position wherein the core cavity 116C is substantially aligned with the first cavity 112. A first material 46 is then introduced into the first cavity 112 and the second cavity 118 through a first passage 119. As described in regards to the second step 22, both the first cavity 112 and the second cavity 118 are filled with the first material 46. The first material 46 then conforms to the shape of the first cavity 112 and the second cavity 118, thereby forming the trim panel 12. The trim panel 12 is then removed from the mold assembly 102 by any suitable method.

A third step of the second alternate embodiment of the method is illustrated generally at 100 in FIGS. 10 and 11. In the third step 100, the core 116 is moved downwardly within the core cavity 114, as viewed in FIG. 10, and into the second position. The first material 46, or any desired material, is then introduced into the first cavity 112. The core 116 is then is moved upwardly within the core cavity 114, as viewed in FIG. 11, and into the first position, thereby exposing the second cavity 118. A second material, such as the second material 50, or any desired material, is then introduced into the second cavity 118, as shown in FIG. 11. Preferably, the second material 50 is different from the first material 46, thereby creating the accent region 18, as shown in FIG. 1, having an aesthetically and tactilely pleasing surface.

The trim panel 12 is then removed from the mold assembly 24 by any suitable method. For example, after the first mold half 104 is moved outwardly from the second mold half 106, the first core half 116A may be at least partially separated from the second core half 116B so as allow removal of the trim panel 12 from the core cavity 116C. It will be appreciated that the second step of the second alternate embodiment may be performed prior to the third step 100, or the third step 100 may be performed prior to the second step.

Figure 12:
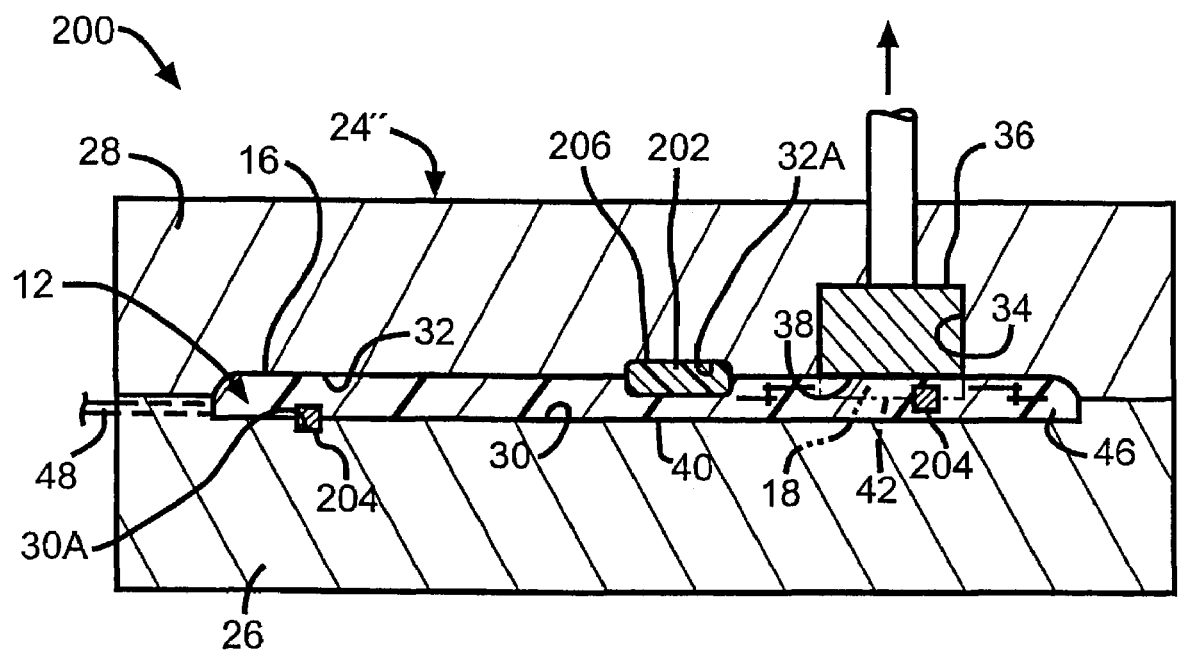
FIG. 12 is a cross sectional elevational view showing the vehicle trim panel illustrated in FIG. 1 in a mold used in accordance with a third step of an additional alternate embodiment of the method of this invention.

FIG. 12 illustrates a third alternate embodiment of the mold assembly 24" according to a third alternate embodiment of the method. The mold assembly 24" is substantially identical to the mold assembly 24 illustrated in FIG. 2, and will not be further described herein.

A second step of the third alternate embodiment of the method of this invention is substantially identical to the second step 22 shown in FIG. 2. A third step of the third alternate embodiment of the method is illustrated generally at 200 in FIG. 12. In the third step, a fourth material can be introduced within the first cavity 40 or the second cavity 42. The fourth material can be any suitable material such as a first insert 202 or a second insert 204. The insert 202 can be any desired insert formed from any desired material, such as polypropylene or steel. Preferably, the first insert 202 is relatively rigid having a decorative or ornamental surface 206 that will be visible to a vehicle occupant. The first insert 202 can be positioned within a cavity 32A formed in the mold surface 32, or can be positioned such that the surface 206 is adjacent the mold surface 32. Although only one first insert 202 in illustrated in FIG. 12, any desired number of first inserts 202 can be provided in the trim panel 12.

The second insert 204 can be any desired insert, such as a fastener. The insert 204 can be formed from any desired material, such as polypropylene or steel. Preferably, the second insert 204 is positioned such that the insert 204 will not be visible to a vehicle occupant, such as within the trim panel 12, or opposite the surface 16, as shown in FIG. 12. The second insert 204 can be positioned within a cavity 30A formed in the mold surface 30, positioned such that the insert 204 is adjacent the mold surface 30, or positioned such that the insert 204 will be within the trim panel 12. Although two second inserts 204 are illustrated in FIG. 12, any desired number of second inserts 204 can be provided in the trim panel 12.

The core 36 can remain in the first position, as shown in FIG. 12, so that a material can then be introduced into the first cavity 40 through the first passage 48. The material may be any suitable material, such as the first material 46, or the second material 50. The material 46 or 50 thereby substantially surrounds the inserts 202 and 204.

Alternately, the core 36 can be moved downwardly into the second position, as shown in FIG. 4. A material, such as first material 46 or second material 50, is then introduced into the first cavity 40, as described above. The core 36 can then be moved upwardly within the core cavity 34, and into the first position, thereby exposing the second cavity 42. A desired material, such as the second material 50, is then introduced into the second cavity 42, as shown in phantom line in FIG. 12. Preferably, the second material 50 is different from the first material 46, thereby creating the accent region 18. The trim panel 12 is then removed from the mold assembly 200 by any suitable method.

It will be appreciated that the second step of the third alternate embodiment may be performed prior to the third step 200, or the third step 200 may be performed prior to the second step. It will be further appreciated that the third alternate embodiment can be performed using the mold 24", as shown in FIG. 12, the mold 24, as shown in FIG. 2, the mold 24', as shown in FIG. 7, the mold 102, as shown in FIG. 10, or any desired mold assembly.

Figure 13:
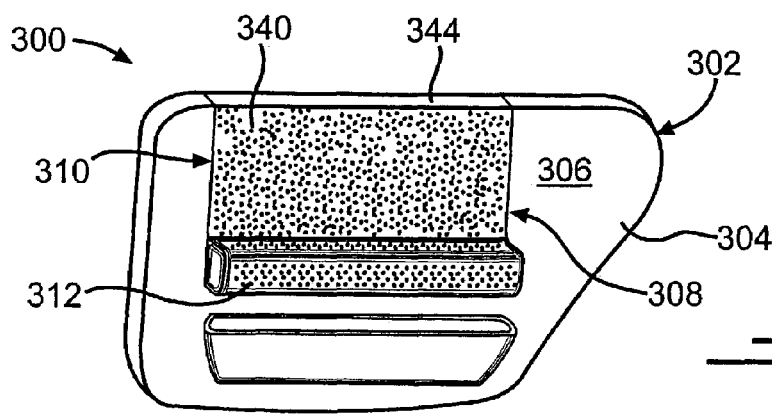
FIG. 13 is a perspective view of an overmolded trim component manufactured according to the method of this invention.

Referring now to FIG. 13, an overmolded vehicle trim component for a vehicle is generally shown at 300. The trim component 300 comprises a substrate 302 of a first material 304 having an exterior surface 306. The trim component 300 of the exemplary embodiment is an automotive door trim panel 300 which mounts to a vehicle door assembly. It will be appreciated however, that the trim component 300 of the subject invention may be any type of trim component associated with a vehicle. For example, other types of trim components include trunk panels, quarter panels, rear package trays, headliners, instrument panels, garnish moldings, and console panels, among others.

The exterior surface 306 of the door trim panel 300 may include a decorative surface portion, such as the accent region 308. The accent region 308 of the exemplary embodiment includes a bolster region 310 and an armrest 312 of the door trim panel 300. However, it will be appreciated that the accent region 308 of the subject invention may be any type of accent region associated with a vehicle trim components. For example, the accent region 308 may be associated with a trunk panel, a quarter panel, a rear package tray, a headliner, an instrument panel, a garnish molding, a console panel, and the like.

Figure 14:
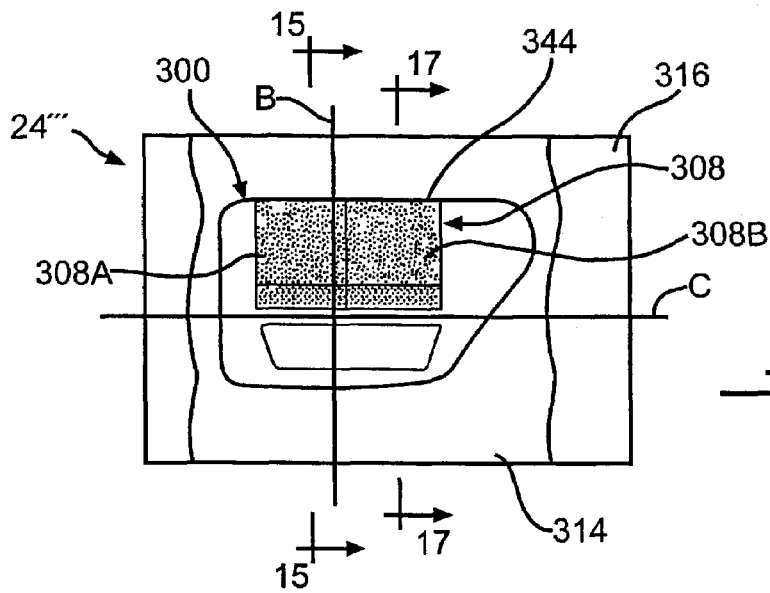
FIG. 14 is a fragmentary plan view showing the overmolded trim component illustrated in FIG. 13 in a mold assembly used in accordance with the method of this invention.

It will be further appreciated that the accent region 308 can include more than one portion, such as a first portion 308A and a second portion 308B, as shown in FIG. 14. The door trim panel 300 can also include any desired number of accent regions, and each accent region can included any desired number of accent portions.

Although not illustrated in FIG. 13, it will be appreciated that portions of the trim component 300 may be covered with a decorative trim material such as cloth, vinyl, leather, and/or carpeting. The trim component 300 may be attached to the vehicle door assembly by any suitable fasteners (not shown) as is well known in the art.

Referring now to FIGS. 14 through 18, there is illustrated a mold assembly, indicated generally at 24''', which is adapted to manufacture the trim component 300 in accordance with the method of this invention. Preferably, the mold assembly 24''' includes a first mold portion 314 and a second mold portion 316. The second mold portion 316 includes a core cavity 318 for slidably receiving a movable mold element or core 320. The movable core 320 includes at least a first mold surface 322, and a second mold surface 324. The first mold portion 314 includes a third mold surface 326, and the second mold portion 316 includes a fourth mold surface 328.

Figure 15:
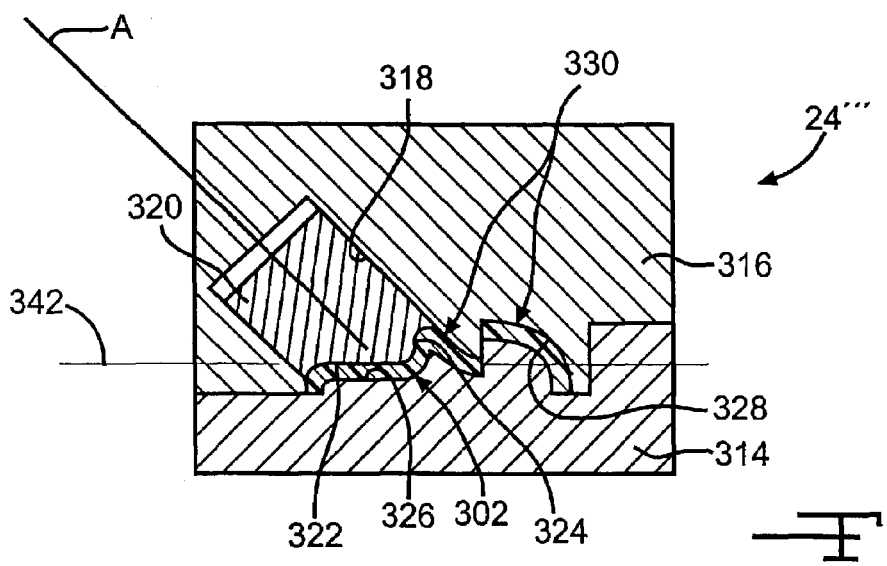
FIG. 15 is a cross-sectional view taken along line 15—15 of FIG. 14, showing a first movable core of the mold assembly in a first position.
Figure 16:
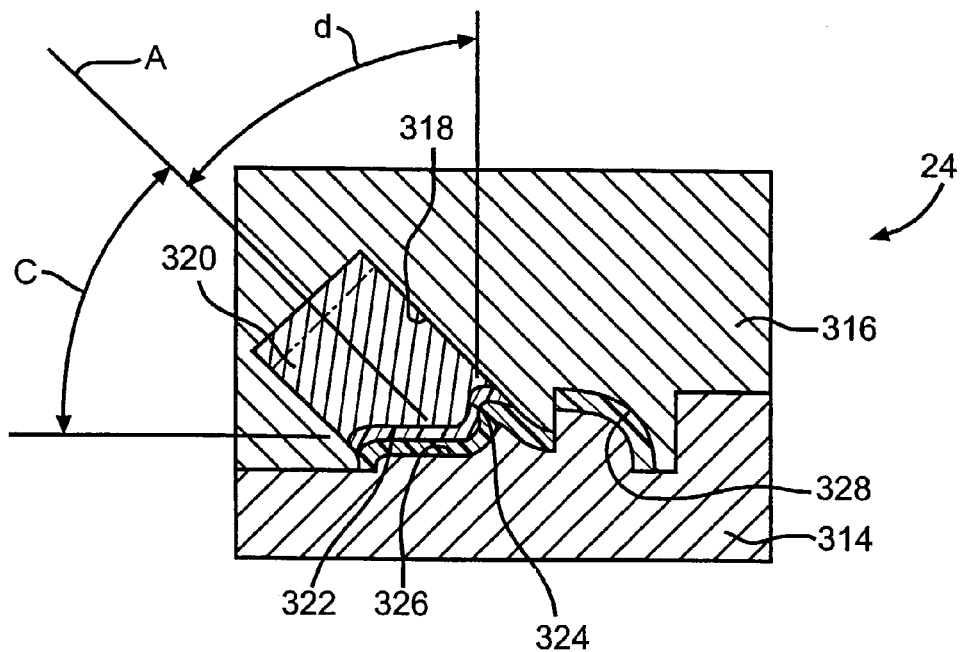
FIG. 16 is a cross-sectional view of the mold assembly illustrated in FIG. 15, showing the movable core in a second position.
Figure 18:
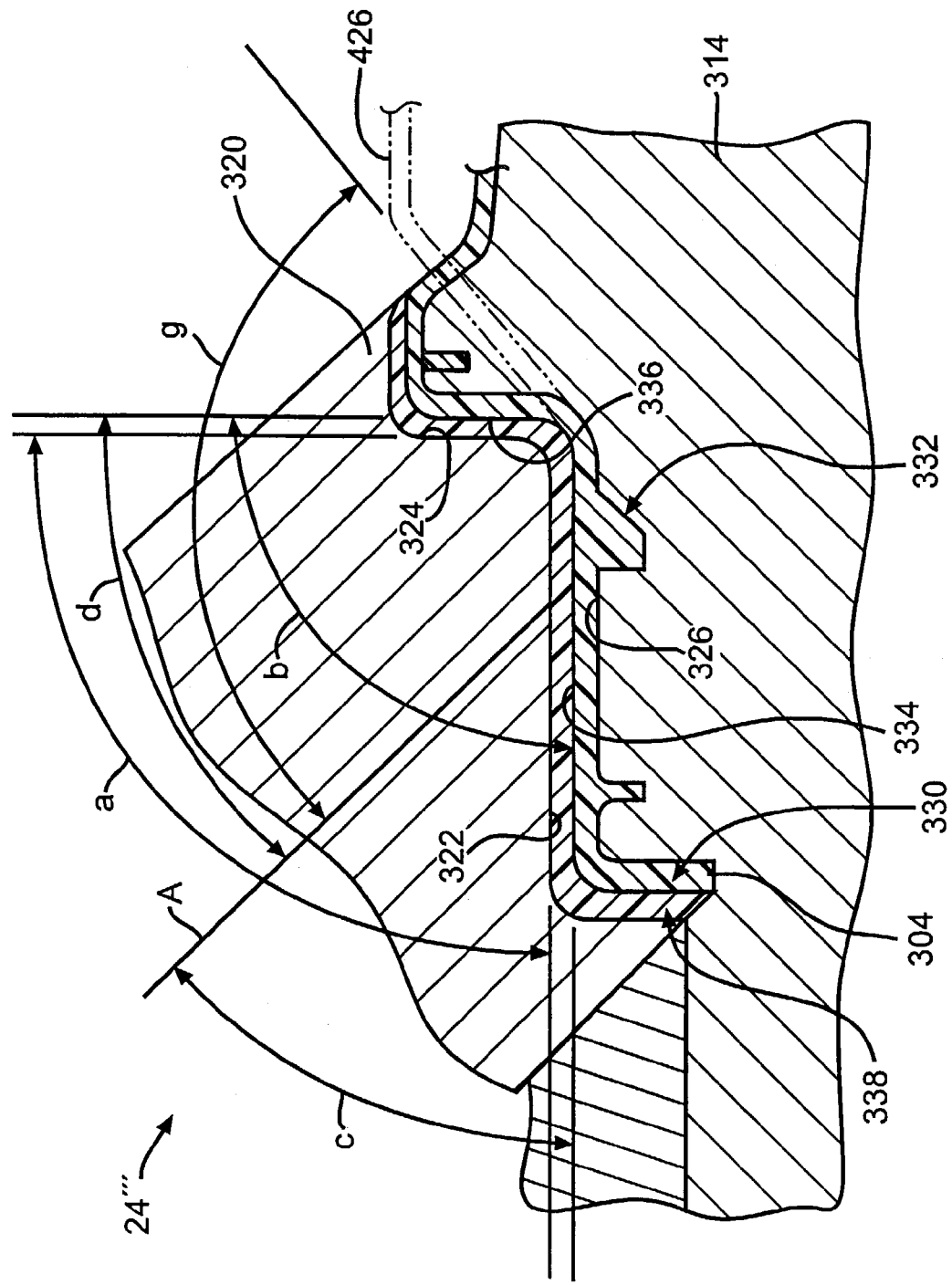
FIG. 18 is an enlarged cross-sectional view of a portion of the mold assembly illustrated in FIG. 16, showing the movable core in the second position.

As best shown in FIG. 18, the second mold surface 324 is preferably positioned at a first angle $\alpha$ with respect to the first mold surface 322. Preferably the movable core 320 is movable between a first position, as shown in FIG. 15, and a second position, as shown in FIGS. 16 and 18, along a first axis A. More preferably, the movable core 320 is movable along the first axis A in a linear manner.

The first mold portion 314 and the second mold portion 316 are preferably mounted to platens (not shown) of a press (not shown), such as a vertical molding press with sufficient tonnage to accomplish the method herein described. When in the first position, as shown in FIG. 15, the first mold portion 314, the second mold portion 316, and the movable core 320 form a first cavity 330. Preferably, the first cavity 330 is defined by the third mold surface 326 of the first mold portion 314, the fourth mold surface 328 of the second mold portion 316, and the first and second mold surfaces 322 and 324 of the movable core 320.

It will be appreciated, that in accordance with the fourth embodiment of the invention, a first step of the method of the invention includes providing a suitable mold assembly 24'''.

A second step of the method of this invention is illustrated generally in FIG. 15. In the second step, the movable core 320 is moved downwardly within the core cavity 318, as viewed in FIG. 15, and into the first position. The first material 304 is then introduced into the first cavity 330 by any desired method, thereby forming a substrate 302. The first material 304 may be any suitable material, such as molten plastic. Preferably the first material is polypropylene, although the first material can also be any desired material.

As best shown in FIG. 18, the substrate 302 preferably includes a first substrate surface 334 and a second substrate surface 336. Preferably, the first substrate surface 334 is at a second angle b with respect to the second substrate surface 336. The movable core 320 is preferably oriented at a third angle c with respect to the first substrate surface 334, and at a fourth angle d with respect to the second substrate surface 336.

Preferably, the third angle c and the fourth angle d are within the range of from about 30 degrees to about 60 degrees. More preferably, the third angle c and the fourth angle d are within the range of from about 40 degrees to about 50 degrees. Most preferably, the third angle c and the fourth angle d are about 45 degrees.

Figure 17:
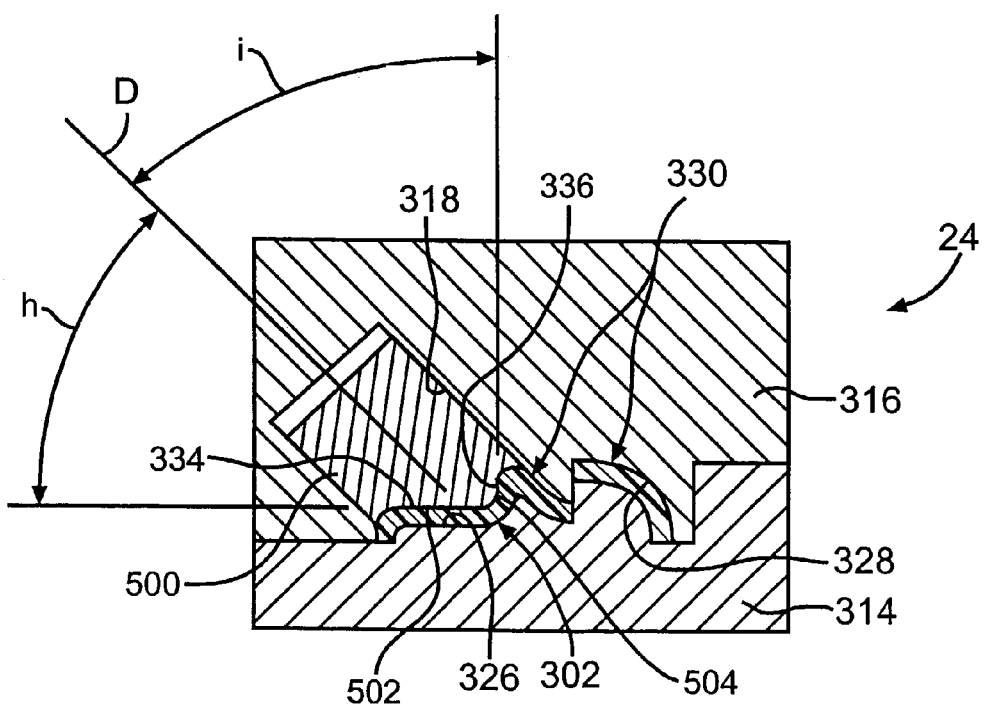
FIG. 17 is a cross-sectional view taken along line 17—17 of FIG. 14, showing a second movable core of the mold assembly in a first position.

The movable core 320 is then moved upwardly within the core cavity 318, as viewed in FIGS. 16 and 17, and into the second position, thereby exposing a second cavity 338.

Preferably, the second cavity 338 is defined by the first and second substrate surfaces 334 and 336, and the first and second mold surfaces 322 and 324 of the movable core 320.

A second material 340 is then introduced into the second cavity 338 by any desired method, thereby forming the door trim panel 300. The second material 340 may be any suitable material, such as molten plastic. Preferably the second material is thermoplastic urethane (TPU), although the second material 340 can also be any desired material. Preferably, however, the second material 340 has characteristics different from the first material 304, thereby creating a bolster region 310 and an armrest 312 having an aesthetically and tactilely pleasing surface.

As shown in FIG. 15, the substrate 302 includes a major surface defining a first plane 342. The first plane 342 includes a second axis B substantially perpendicular to a third axis C, as shown in FIG. 14. Preferably, the first axis A of the movable core 320 is substantially coplanar with either the second axis B or the third axis C. More preferably, the first axis A of the movable core 320 is substantially coplanar with the second axis B.

It will be appreciated that when the mold assembly 24''' is in the first position, the movable core forms the first and second substrate surfaces 334 and 336. Significantly, the movement of movable core 320 along the first axis A from the first position to the second position exposes the first and second substrate surfaces 334 and 336, such that an accent region 308 of substantially uniform thickness can be molded over the substrate 302. Such movement of the movable core 320 further allows for the overmolding of a first edge portion 344 of the door trim panel 300.

Figure 19:
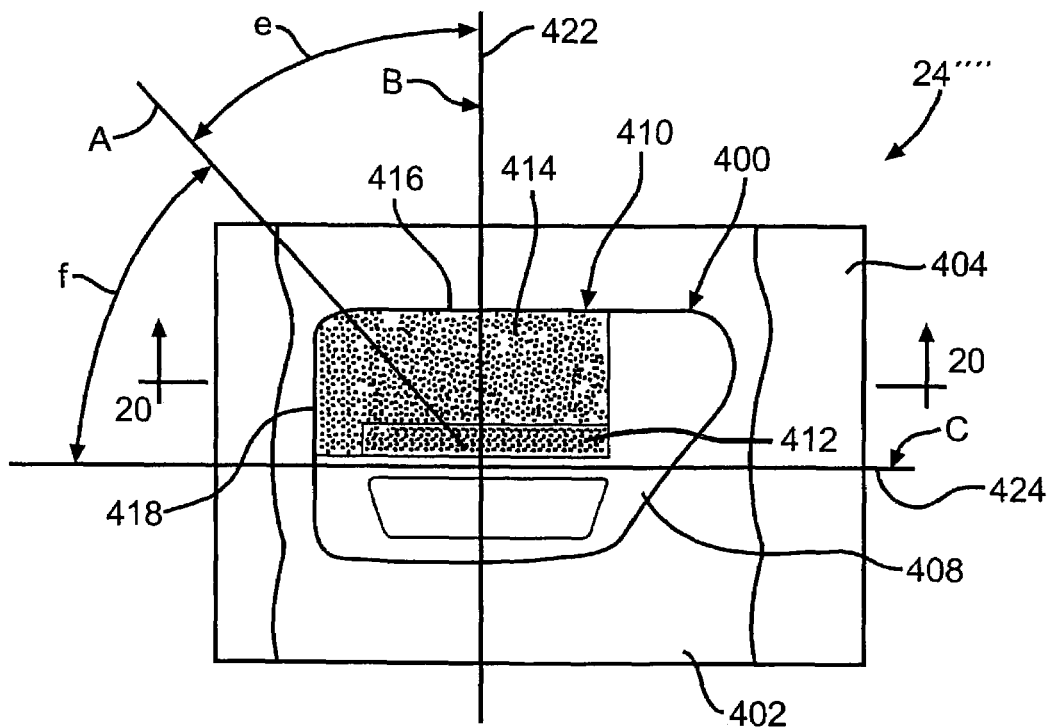
FIG. 19 is a fragmentary plan view showing an alternate embodiment of an overmolded trim component in a mold assembly used in accordance with the method of this invention.
Figure 20:
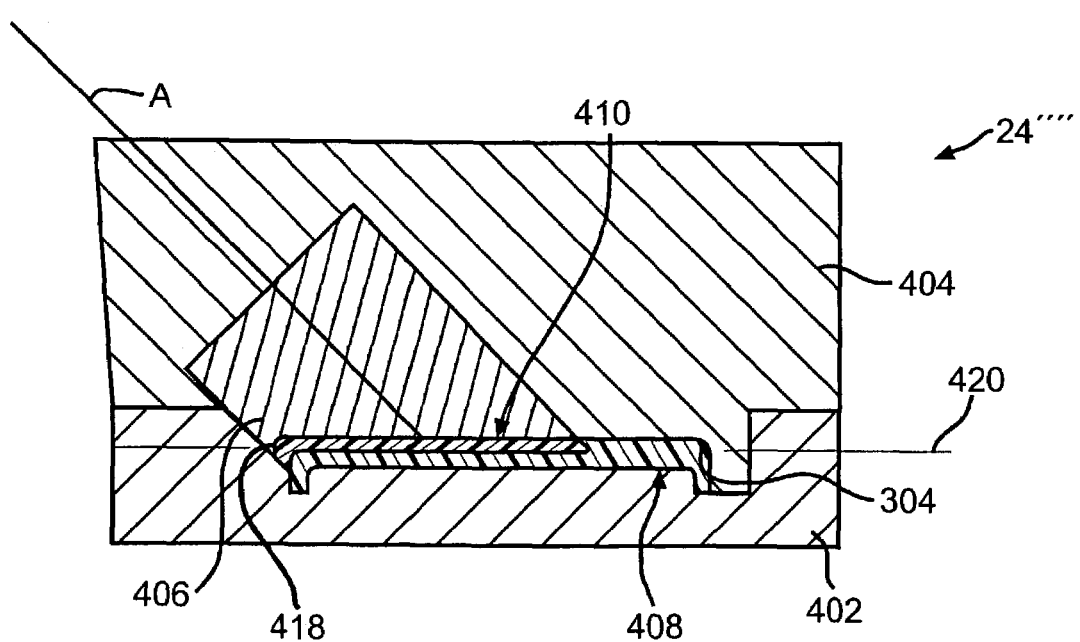
FIG. 20 is a cross-sectional view taken along line 20—20 of FIG. 19, showing the movable core of the mold assembly in the second position.

Referring now to FIGS. 19 and 20, there is illustrated a mold assembly 24'''', which is adapted to manufacture an additional embodiment of the door trim panel 400 in accordance with the method of this invention. The mold assembly 24'''' is substantially identical to the mold assembly 24''', and includes a first mold portion 402, a second mold portion 404, and a movable core 406.

The door trim panel 400 is substantially identical to the door trim panel 300 and comprises a substrate 408 of the first material 304 and an accent region 410. The accent region 410 includes an armrest 412 and a bolster region 414 having a first edge portion 416. However, the bolster region 414 additionally includes a second edge portion 418.

As shown in FIG. 20, the substrate 408 includes a major surface defining a first plane 420. The first plane 420 includes the second axis B substantially perpendicular to the third axis C, as shown in FIG. 19. A second plane 422 is defined through the second axis B. The second plane 422 is substantially perpendicular with respect to the first plane 420. A third plane 424 is defined through the third axis C, and is substantially perpendicular with respect to the first plane 420. The first axis A of the movable core 406 is further oriented at a fifth angle e with respect to the second plane 422 and at a sixth angle f with respect to the third plane 424.

If desired, the mold assemblies 24''' and 24'''' can include a fifth mold surface (not shown) to define a third cavity in the door trim panels 300 and 400, respectively. Preferably, the third cavity is obstructed when the movable core 406 is in the first position and in the second position, such that the third cavity is exposed when the door trim panels 300 and 400 are removed from the mold assemblies 24''' and 24'''', respectively. A third material, such as the third material 62 shown in FIG. 9, can then be disposed within the third cavity. The third material is preferably a decorative strip comprising plastic, fabric, leather, wood, or any other desired material.

Alternately, the third material 62 can be disposed within one of the first cavity 330 and the second cavity 338 prior to any material being introduced into the mold assembly. Preferably, the third material 62 is positioned such that a portion of the third material 62 is exposed, such as shown in FIG. 9, after the first and the second materials 304 and 340, respectively, have been introduced into the cavities 330 and 338.

The third angle c between the axis A and the first substrate surface 334 and the fourth angle d between the axis A and the second substrate surface 336 are illustrated as acute angles in the exemplary embodiment shown in FIG. 17. However, it will be appreciated that the third angle c and the fourth angle d can be any desired angle, including an obtuse angle. For example, the axis A of the movable core 320 can be oriented at an obtuse angle g with respect to a third substrate surface 426 (shown by a phantom line in FIG. 17).

Advantageously, a bolster region 310 and an armrest 312 having multiple surface angles can be formed simultaneously in a mold assembly adapted to manufacture the door trim panel 300 in accordance with the method of this invention.

It will be appreciated that the door trim panel 300 can also include the first and the second access portion 308A and 308B, respectively. To form such access portions 308A and 308B, the mold assembly 24''' can include a second movable mold element or core 500, such as shown in FIG. 17. The movable core 500 is substantially identical to the movable core 320, and includes a third mold surface 502 and a fourth mold surface 504.

When in the first position, as shown in FIG. 17, the first mold portion 314, the second mold portion 316, and the second movable core 500 form a portion of the first cavity 330. Preferably, the portion of the first cavity 330 is defined by the third mold surface 326 of the first mold portion 314, the fourth mold surface 328 of the second mold portion 316, and the third and fourth mold surfaces 502 and 504 of the second movable core 500.

When in a second position (not shown), the second movable core 500 defines a fourth cavity. Preferably, the fourth cavity is defined by a portion of the first and second substrate surfaces 334 and 336, and the third and fourth mold surfaces 502 and 504 of the second movable core 500.

Preferably, the second movable core 500 is movable between the first position and the second position along a fourth axis D. More preferably, the second movable core 500 is movable along the fourth axis D in a linear manner. The second movable core 500 is preferably oriented at a seventh angle h with respect to the first substrate surface 334, and at an eighth angle i with respect to the second substrate surface 336.

Preferably, the seventh angle h and the eighth angle i are within the range of from about 30 degrees to about 60 degrees. More preferably, the seventh angle h and the eighth angle i are within the range of from about 40 degrees to about 50 degrees. Most preferably, seventh angle h and the eighth angle i are about 45 degrees.

It will be appreciated that a mold assembly adapted to manufacture a trim component in accordance with the method of this invention can include any desired number of movable cores which define any desired number of cavities. In addition to the movable core 320 shown in FIGS. 15 and 16, the mold assembly can also include a movable core such as the movable core 36 shown in FIG. 2. It will be further appreciated that the material, such as the first and second materials 304 and 340, can be introduced into the cavities in any desired sequence.

The principle and mode of operation of this invention have been described in its preferred embodiments. However, it should be noted that this invention may be practiced otherwise than as specifically illustrated and described without departing from its scope.

What is claimed is:

1. A method of manufacturing an overmolded trim component for a vehicle, the method comprising the steps of:
   a. providing a mold assembly including a first mold portion and a second mold portion, the mold assembly further including a movable mold element which is movable between first and second positions, wherein the movable mold element includes a first mold surface and a second mold surface positioned at a first angle with respect to the first mold surface;
   b. positioning the movable mold element into the first position to define a first cavity defined by the first mold portion and the first and second mold surfaces of the movable mold element, wherein the first and second mold surfaces of the movable mold element are exposed to the cavity;
   c. introducing a first material into the first cavity, thereby forming a substrate having a first substrate surface and a second substrate surface formed adjacent the exposed first and second mold surfaces of the movable mold element, wherein the first substrate surface is at a second angle with respect to the second substrate surface;
   d. positioning the movable mold element into the second position to define a second cavity defined by a portion of the first and second substrate surfaces and the first and second mold surfaces of the movable mold element; and
   e. introducing a second material into the second cavity, thereby forming an overmolded trim component such that the second material is positioned over and covers the substrate.

2. The method according to claim 1, wherein the movable mold element is movable along a first axis in a linear manner, and wherein the first axis is oriented at a third angle with respect to the first substrate surface and at a fourth angle with respect to the second substrate surface.

3. The method according to claim 1, wherein the movable mold element is movable along a first axis between the first and second positions.

4. The method according to claim 3, wherein the substrate includes a major surface defining a first plane, the first plane including a second axis substantially perpendicular to a third axis, and wherein the first axis is substantially coplanar with one of second axis and the third axis.

5. The method according to claim 4, wherein a second plane is defined through the second axis and is substantially perpendicular with respect to the first plane, and a third plane is defined through the third axis and is substantially perpendicular with respect to the first plane, and wherein the first axis is further oriented at a fifth angle with respect to the second plane and at a sixth angle with respect to the third plane.

6. The method according to claim 1, wherein the mold assembly of step (a) further includes a third cavity, the third cavity being obstructed when the movable mold element is in the first position and in the second position.

7. The method according to claim 5, further including the steps of removing the trim component from the mold assembly to expose the third cavity, and mounting a third material within the third cavity.

8. The method according to claim 1, wherein the first cavity is for forming a first trim component portion having a first surface texture, the second cavity being for forming an accent region having a second surface texture.

9. The method according to claim 1, wherein the first cavity is for forming a first trim component portion having a first hardness, the second cavity being for forming an accent region having a second hardness.

10. The method according to claim 8, wherein the first hardness is harder relative to the second hardness.

11. The method according to claim 1, wherein the first cavity is for forming a first trim component portion having a first color, the second cavity being for forming an accent region having a second color.

12. The method according to claim 2, wherein one of the third angle and the fourth angle is an acute angle.

13. The method according to claim 2, wherein the third angle and the fourth angles are acute angles.

14. The method according to claim 2, wherein one of the third angle and the fourth angle is an obtuse angle.

15. The method according to claim 2, wherein the third angle and the fourth angles are obtuse angles.

16. The method according to claim 1, wherein the second material covers only a portion of the first and second substrate surfaces.

17. The method according to claim 1, wherein the movable mold element defines a first movable mold element and the mold assembly further includes a second movable mold element having third mold surface and a fourth mold surface; wherein the second movable mold element is first positioned in a first position to define the first cavity;
   wherein the second movable mold element is subsequently positioned in a second position;
   wherein the second position of the second movable mold element defines a third cavity defined by a portion of the first and second substrate surfaces and the third and fourth mold surfaces of the second movable mold element;
   wherein a fourth material is introduced into the third cavity, thereby forming an overmolded trim component portion; and
   wherein the second movable mold element is oriented at a seventh angle with respect to the first substrate surface and at an eighth angle with respect to the second substrate surface.

18. The method according to claim 1, wherein a third material is disposed within one of the first cavity and the second cavity such that a portion of the third material is exposed after the first and the second materials have been introduced.

19. The method according to claim 1, wherein the second position of the movable mold element enables thickness of the second material adjacent the first substrate surface to be substantially uniform with respect to the thickness of the second material adjacent the second substrate surface.

20. The method according to claim 2, wherein the substrate defines a major surface of the trim component, and the first axis is at a non-perpendicular angle with respect to the substrate.

* * * * *